United States Patent
Malnati

(10) Patent No.: US 8,832,490 B2
(45) Date of Patent: Sep. 9, 2014

(54) SERVER CONTROL AUTOMATION

(75) Inventor: James Malnati, Stillwater, MN (US)

(73) Assignee: Unisys Corporation, Blue Bell, PA (US)

(*) Notice: Subject to any disclaimer, the term of this patent is extended or adjusted under 35 U.S.C. 154(b) by 202 days.

(21) Appl. No.: 13/536,108

(22) Filed: Jun. 28, 2012

(65) Prior Publication Data

US 2013/0305084 A1 Nov. 14, 2013

Related U.S. Application Data

(60) Provisional application No. 61/645,709, filed on May 11, 2012.

(51) Int. Cl.
*G06F 11/00* (2006.01)
*G06F 11/07* (2006.01)
*G06F 11/32* (2006.01)
*G06F 11/30* (2006.01)
*G06F 11/20* (2006.01)

(52) U.S. Cl.
CPC ........ *G06F 11/3055* (2013.01); *G06F 11/0775* (2013.01); *G06F 11/2048* (2013.01); *G06F 11/2038* (2013.01); *G06F 11/324* (2013.01); *G06F 11/3006* (2013.01); *G06F 11/2028* (2013.01); *G06F 11/0709* (2013.01)
USPC .......................................... 714/4.11; 714/4.4

(58) Field of Classification Search
CPC ... H04L 43/0817; G06F 11/142; G06F 11/20; G06F 11/2023; G06F 11/2028
USPC ........................................ 714/4.11, 4.12, 4.4
See application file for complete search history.

(56) References Cited

U.S. PATENT DOCUMENTS

| | | | | |
|---|---|---|---|---|
| 6,802,062 | B1 * | 10/2004 | Oyamada et al. | 718/1 |
| 7,062,674 | B2 * | 6/2006 | Takamoto | 714/13 |
| 7,287,186 | B2 * | 10/2007 | McCrory et al. | 714/13 |
| 7,543,174 | B1 * | 6/2009 | van Rietschote et al. | 714/47.2 |
| 7,937,616 | B2 * | 5/2011 | Armstrong et al. | 714/13 |
| 8,015,432 | B1 * | 9/2011 | Vaidya | 714/4.11 |
| 8,555,110 | B2 * | 10/2013 | Shimose | 714/13 |
| 2006/0064571 | A1 * | 3/2006 | Tseng | 713/1 |
| 2006/0253724 | A1 * | 11/2006 | Zhang | 714/2 |
| 2007/0245167 | A1 * | 10/2007 | De La Cruz et al. | 714/4 |
| 2008/0091746 | A1 * | 4/2008 | Hatasaki et al. | 707/204 |
| 2008/0120518 | A1 * | 5/2008 | Ritz et al. | 714/3 |
| 2008/0155310 | A1 * | 6/2008 | Langen et al. | 714/6 |
| 2008/0235533 | A1 * | 9/2008 | Hatasaki et al. | 714/4 |
| 2008/0294933 | A1 * | 11/2008 | Nishii et al. | 714/5 |
| 2010/0268983 | A1 * | 10/2010 | Raghunandan | 714/3 |
| 2011/0271140 | A1 * | 11/2011 | Katano et al. | 714/4.11 |
| 2012/0011392 | A1 * | 1/2012 | Hatasaki et al. | 714/4.11 |
| 2012/0266012 | A1 * | 10/2012 | Rothman et al. | 714/2 |
| 2013/0047027 | A1 * | 2/2013 | Hatasaki et al. | 714/4.11 |

* cited by examiner

*Primary Examiner* — Marc Duncan
(74) *Attorney, Agent, or Firm* — Richard J. Gregson

(57) ABSTRACT

Control over servers and partitions within a computer network may be automated to improve response to disaster events within the computer network. For example, a monitoring server may be configured to automatically monitor servers through remote communications sessions. A disaster event may be detected based on information received from the partitions and servers within the network. After a disaster event occurs, the monitoring server may automatically execute a script or take other action to make a backup server or partition available. For example, the monitoring server may stop and deactivate a first partition that has failed, activate a second partition that is a mirror image of the first partition, and start the second partition.

20 Claims, 11 Drawing Sheets

SERVER CONTROL AUTOMATION

CROSS-REFERENCE TO RELATED APPLICATIONS

This application claims priority to U.S. Provisional Application No. 61/645,709 filed on May 11, 2012, and entitled "Server Control Automation," which is hereby incorporated by reference.

FIELD OF THE DISCLOSURE

The instant disclosure relates to computer networks. More specifically, this disclosure relates to disaster recovery for computer networks.

BACKGROUND

Computer networks have become backbones of companies throughout the world. Even if a company does not provide products or services over the internet, computer networks within the company improve employee productivity by providing employees with instantaneous access to millions of bytes of data. In fact, many companies are unable to function when the company's computer network fails. Thus, it is imperative that companies have reliable computer networks with 99.999% up time.

Conventionally, a computer network may be provided with additional resiliency to failures by having a disaster recovery plan. That is, when a failure in the computer network occurs, a plan is available to quickly bring the computer network back to functional status. Disaster recovery plans may include actions taken by one or more actors. For example, a recovery plan may include switching to backup systems at the location of the failure. More drastic disasters may call for switching to backup systems at a location remote from the site of the failure.

However, computer networks often contain many disparate systems. For example, a company may rely on several applications executing on several different servers for information services. Managing the different applications and different servers often require different skill sets. Thus, the company may employ several sets of employees to manage the applications.

Further, the different applications are managed by different control interfaces. Because the control interfaces and applications operate unaware of the status of other applications and servers, it is often difficult to determine when a disaster has occurred. Alerts from each of the different servers may be necessary to understand the status of the computer network and determine that a disaster has occurred. After the disaster is identified, controlling each application and server requires different employees to perform different activities throughout the computer network. The lack of an integrated control interface for interacting with different components of a computer network, such as servers and applications, results in long delays between a disaster occurring, detecting a disaster has occurred, taking actions to recover after the disaster, and returning to normal operation after the disaster.

SUMMARY

According to one embodiment, a method includes detecting, by a monitoring server, a disaster event affecting a first partition of a first server. The method also includes stopping and deactivating, by the monitoring server, the first partition of the first server. The method further includes activating, by the monitoring server, a second partition of a second server. The method also includes starting, by the monitoring server, the second partition of the second server.

According to another embodiment, a computer program product includes a non-transitory computer readable medium having code to detect, by a monitoring server, a disaster event affecting a first partition of a first server. The medium also includes code to stop and to deactivate, by the monitoring server, the first partition of the first server. The medium further includes code to activate, by the monitoring server, a second partition of a second server. The medium also includes code to start, by the monitoring server, the second partition of the second server.

According to a further embodiment, an apparatus includes a memory, a network interface, and a processor coupled to the memory and the network interface. The processor is configured to detect, through the network interface, a disaster event affecting a first partition of a first server. The processor is further configured to deactivate, through the network interface, the first partition of the first server. The processor is also configured to activate, through the network interface, a second partition of a second server. The processor is further configured to start, through the network interface, the second partition of the second server.

According to yet another embodiment, a method includes receiving, at a monitoring server, first information regarding the state of operations of a first partition of a first server. The method also includes receiving, at a monitoring server, second information regarding the state of operations of a second partition of a second server. The method further includes determining whether a disaster event has occurred based, in part, on the first information and the second information. The method also includes generating a trouble ticket corresponding to the disaster event.

According to another embodiment, a computer program product includes a non-transitory computer readable medium having code to receive, at a monitoring server, first information regarding the state of operations of a first partition of a first server. The medium also includes code to receive, at a monitoring server, second information regarding the state of operations of a second partition of a second server. The medium further includes code to determine whether a disaster event has occurred based, in part, on the first information and the second information. The medium also includes code to generate a trouble ticket corresponding to the disaster event.

According to a further embodiment, an apparatus includes a memory and a processor coupled to the memory. The processor is configured to receive, at a monitoring server, first information regarding the state of operations of a first partition of a first server. The processor is also configured to receive, at a monitoring server, second information regarding the state of operations of a second partition of a second server. The processor is further configured to determine whether a disaster event has occurred based, in part, on the first information and the second information. The processor is also configured to generate a trouble ticket corresponding to the disaster event.

According to yet another embodiment, a method includes monitoring a status of a first server of a first type. The method also includes monitoring a status of a second server of a second type different from the first type. The method further includes displaying information regarding the first server and the second server.

According to another embodiment, a computer program product includes a non-transitory computer readable medium having code to monitor a status of a first server of a first type. The medium also includes code to monitor a status of a second server of a second type different from the first type. The medium further includes code to display information regarding the first server and the second server.

According to a further embodiment, an apparatus includes a memory and a processor coupled to the memory. The processor is configured to code to monitor a status of a first server of a first type. The processor is also configured to monitor a status of a second server of a second type different from the first type. The processor is further configured to display information regarding the first server and the second server.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features that are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the disclosed system and methods, reference is now made to the following descriptions taken in conjunction with the accompanying drawings.

DETAILED DESCRIPTION

Disaster events may be detected by a server monitoring the state of a network. For example, a monitoring server may monitor partitions on other servers of disparate types within the network. The server may provide a graphical interface to allow an administrator to visualize the state and health of the network, generate alerts regarding the state and health of the network, and provide the administrator with an opportunity to take corrective action. Further, the monitoring server may automatically take a set of predetermined actions when a disaster event occurs.

Figure 1:
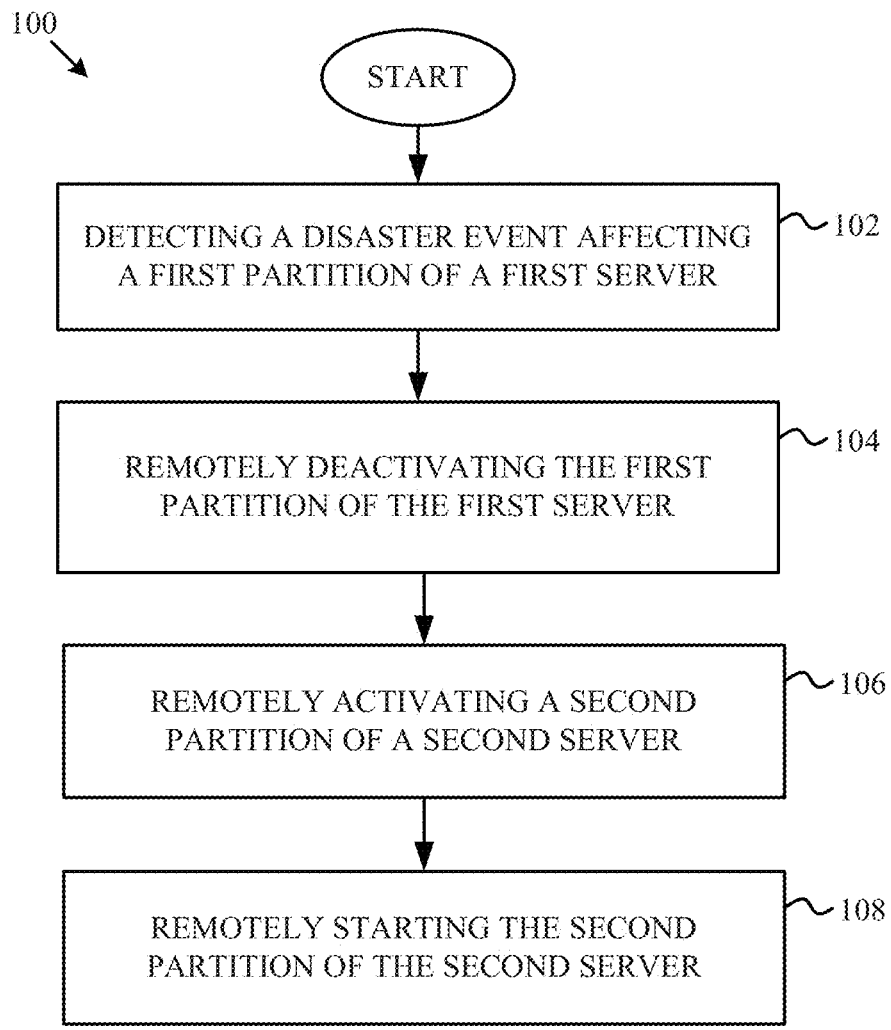
FIG. 1 is a flow chart illustrating an exemplary method for recovering from a disaster event according to one embodiment of the disclosure.

FIG. 1 is a flow chart illustrating an exemplary method for recovering from a disaster event according to one embodiment of the disclosure. A method 100 begins at block 102 with detecting a disaster event affecting a first partition of a first server. The first partition may correspond to a particular application. A disaster event may be, for example the failure of the first server, which may be detected, for example, when a heartbeat message transmitted by the first server is no longer received. The first server may also be detected to have experienced a disaster event when no reply is received from the first server, such as in response to a file request message or a ping operation. A disaster event may occur that still allows the first server to respond to communications. For example, the first server may experience a disaster event that results in data corruption within the first partition. When data corruption is detected in data received from the first server, the first server may be determined to have experienced a disaster event.

At block 104, the first partition of the first server involved in the disaster event may be remotely deactivated. At block 106, a second partition of a second server may be remotely activated. Activating the second partition may include, for example, mounting the partition on the second server. Activating the second partition may also include committing resources of the second server to the second partition based on the profile of the second partition. The second partition may correspond to the same application as the application executing on the first partition. That is, the second partition may be a redundant copy of the first partition. The partitions may be local to the server or stored remotely on a network-attached storage (NAS) device.

At block 108, the second partition of the second server may be remotely started. Starting the second partition may include, for example, making the second partition available for access over a network. Before activating and/or starting a partition, boot settings and/or jump keys may be adjusted automatically for the second partition. Boot settings and jump keys are discussed below with reference to FIGS. 3A-3B.

Control of the first server and the second server may be implemented through a communications session. For example, the first server and the second server may be remotely controlled by issuing commands on the first server and the second server through a telnet communications session. According to one embodiment, the first server and/or the second server may be operations servers having Microsoft Services for Unix (SFU) installed to allow remote telnet access. For example, a telnet communications session may be established with the first server and a command issued at a command-line interface (CLI) of the first server to stop the first partition. A telnet communications session may then be established with the second server and a command issued at a command-line interface (CLI) of the second server to activate and start the second partition. A telnet communications session to either the first server or the second server may be reused to issue other commands or perform other monitoring functions on the first server and/or the second server. Other remote communications sessions may be used to issue commands such as, for example, secure shell (SSH) connections, remote desktop protocol (RDP), and the like. According to one embodiment, the commands issued for stopping, activating, and starting partitions on servers may be scripted to allow automated disaster recovery. In another embodiment, responses received from the servers through the communications session may be automatically parsed to generate alerts and/or trouble tickets.

Although only two partitions and two servers are described in the method 100 of FIG. 1, additional servers and partition may be involved in the disaster recovery process. For example, detecting a disaster event may involve monitoring multiple partitions across multiple servers of different types, as described below with reference to FIG. 8. Further, more than one partition and/or one server may be activated and started in response to the detection of a disaster event. Additionally, other steps may be taken in response to the detection of a disaster event. For example, alerts may be generated for remote display at an administrator's user interface, as discussed below with reference to FIGS. 5A-C and 6.

Figure 2:
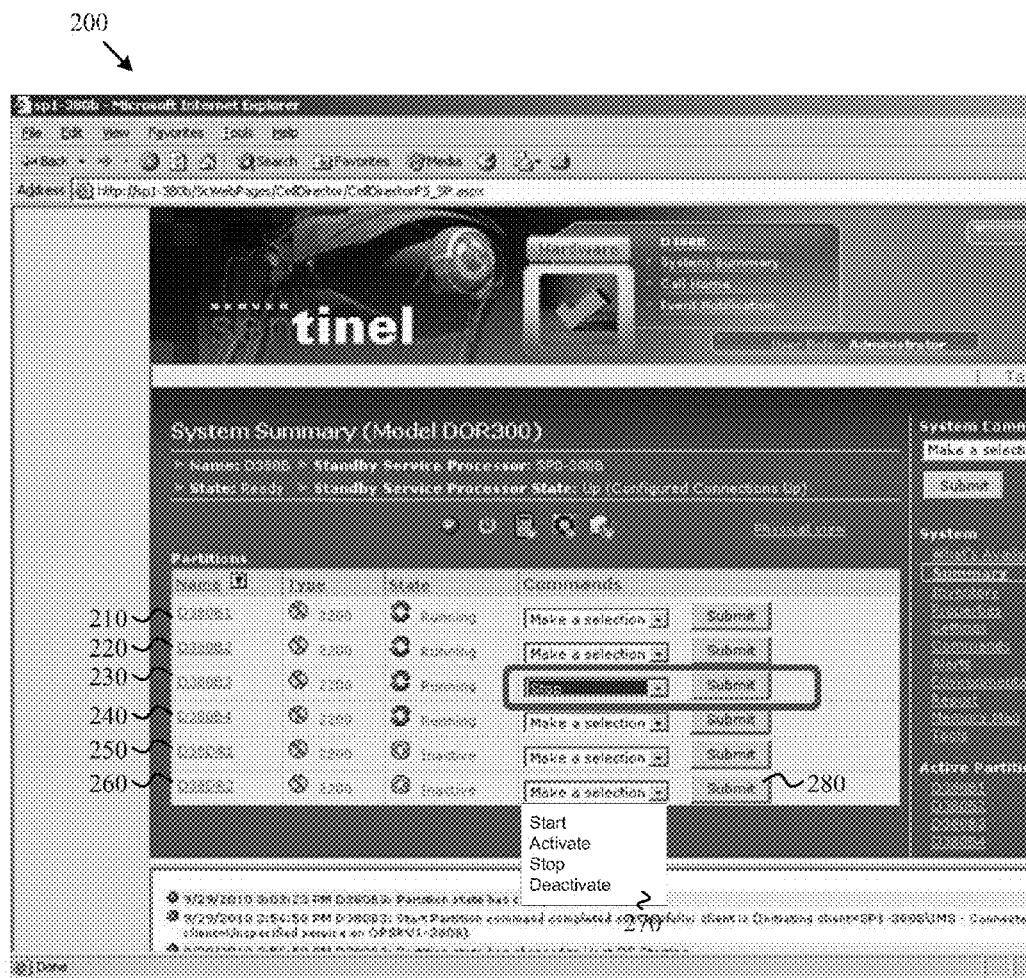
FIG. 2 is a screen shot illustrating remote control of partitions according to one embodiment of the disclosure.

Commands to control partitions on servers may be issued from a central server, such as a monitoring server. FIG. 2 is a screen shot illustrating remote control of partitions according to one embodiment of the disclosure. A display 200 may include a listing of partitions 210, 220, 230, 240, 250, and 260. The listing may also include a type and a state of the partitions 210, 220, 230, 240, 250, and 260. A command may be issued for the partitions 210, 220, 230, 240, 250 and 260 by selecting a command from a command drop-down box 270 and clicking a submit button 280 corresponding to one of the partitions 210, 220, 230, 240, 250, and 260.

Figure 3A:
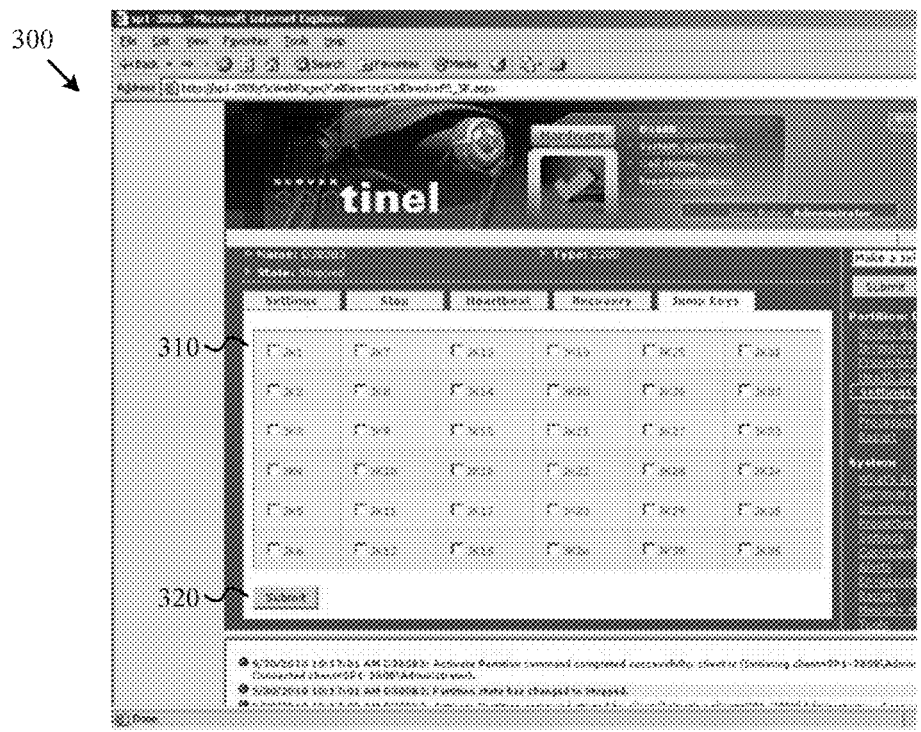
FIG. 3A is a screen shot illustrating setting jump keys for a partition according to one embodiment of the disclosure.

FIG. 3A is a screen shot illustrating setting jump keys for a partition according to one embodiment of the disclosure. After selecting one of the partitions 210, 220, 230, 240, 250, and 260 from the display 200 of FIG. 2, an administrator may set jump keys for the selected partition in a display 300. The display 300 may include a number of true/false selections 310 for each of the available jump keys. The display 300 may also include a submit button 320 to apply the selected jump key settings in the selections 310 to the selected partition.

Jump keys set on a partition may be used to control the action of a server during boot from the partition. A number of jump keys may be configurable on a partition. According to one embodiment, 36 jump keys may be available on any partition, in which a first portion of the jump keys are available for users, a second portion of the jump keys are available for debugging, and a third portion of the jump keys are assigned by a manufacturer. Jump key settings may include, for example, configuration modification, manual dump, autorecovery inhibit, library reload, full dump, initialization, queue recovery inhibition, debug dump, and/or mass storage directory initialization.

Figure 3B:
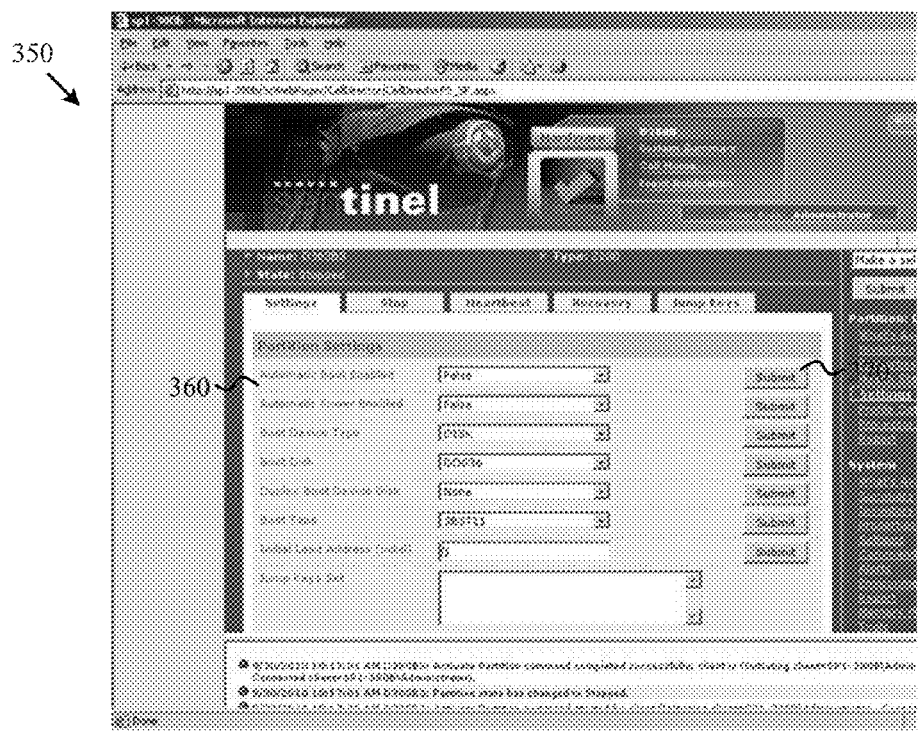
FIG. 3B is a screen shot illustrating boot settings for a partition according to one embodiment of the disclosure.

Boot settings for a selected partition may also be adjusted. FIG. 3B is a screen shot illustrating boot settings for a partition according to one embodiment of the disclosure. A display 350 may display a number of options 360 for a selected partition. Boot settings for a partition may include, for example, automatic boot enabled, automatic power enabled, boot device type, boot disk, duplex boot device disk, boot tape, initial load address, and jump keys set. After the options 360 are set, an administrator may select a submit button 370 to finalize the change in the boot settings for the selected partition.

Figure 4:
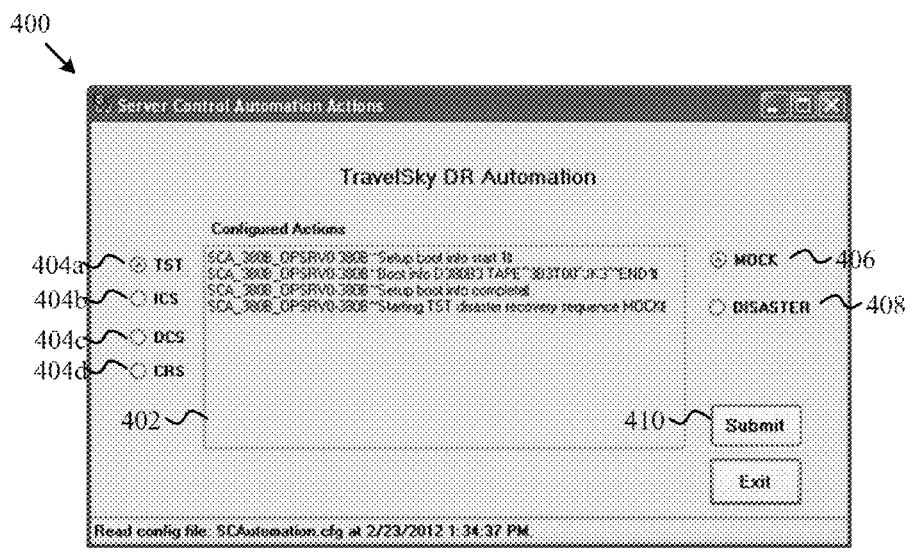
FIG. 4 is a screen shot illustrating scripting of remote commands according to one embodiment of the disclosure.

Settings for each partition may be automatically configured according to scripts. For example, a script may execute to deactivate, activate, and/or start a partition and/or set jump keys or boot settings for a partition. FIG. 4 is a screen shot illustrating scripting of remote commands according to one embodiment of the disclosure. A display 400 may provide an administrator with options for automating server control actions. An administrator may select one of systems 404a, 404b, 404c, and 404d for executing configured actions 402. The configured actions 402 may be loaded from a configuration file or a script file and may include one or more command line commands to execute on one of the systems 404a, 404b, 404c, and 404d through a remote communications session. An administrator may also select whether the script is executed as a mock trial 406 or a response to a disaster 408. If the disaster 408 scenario is selected, then data replication may be active. That is, disaster recovery partitions may not be booted until the data replication for the partition is interrupted or split. If the mock 406 scenario is selected, then the partitions may be booted without interrupting the data replication onto the partitions. According to one embodiment, a configuration file may specify a predetermined order for activating, deactivating, starting, and/or stopping partitions. The configuration file may also specify boot settings and/or jump key settings for each partition.

Figure 5A:
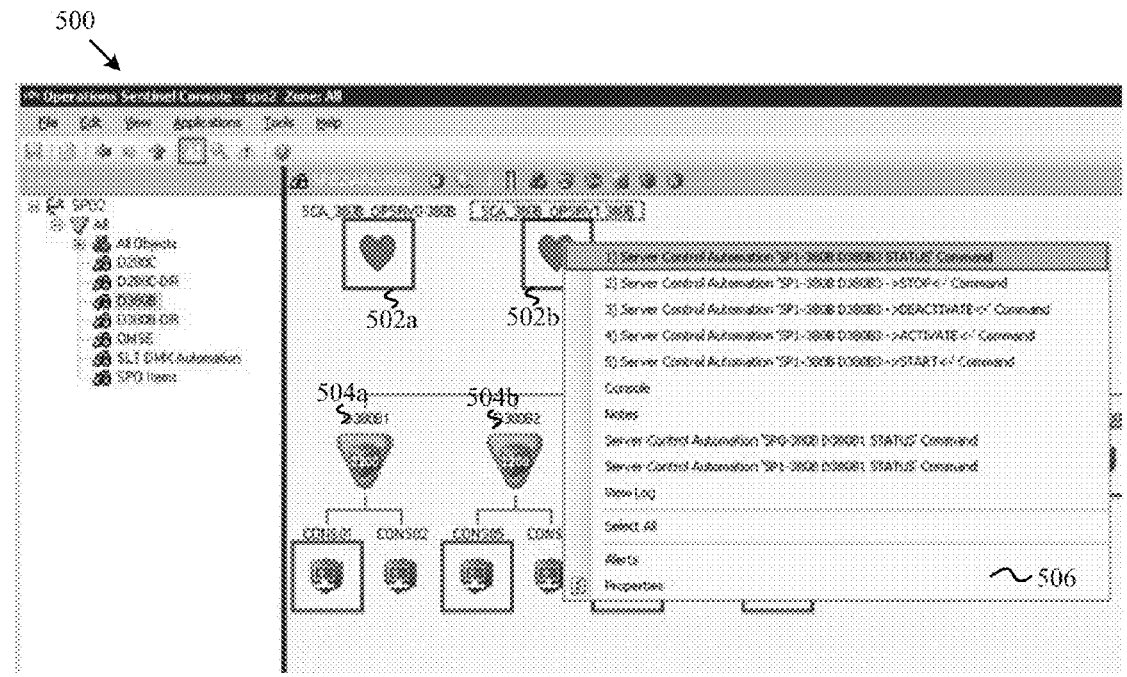
FIG. 5A is a screen shot illustrating remote control of partitions through a hierarchical graphical view according to one embodiment of the disclosure.

The partitions and servers may be illustrated in a graphical hierarchical tree to allow an administrator to quickly visualize resources available on a network. Further, remote control of the partitions and servers on the network may be performed through the graphical hierarchical tree. FIG. 5A is a screen shot illustrating remote control of partitions through a hierarchical graphical view according to one embodiment of the disclosure. A display 500 may illustrate servers 502a and 502b, with partitions 504a and 504b assigned to the server 502b. An administrator may remotely control the servers 502a and 502b through a menu 506. The menu 506 may be customizable for each of the servers 502a and 502b. For example, the menu 506 may include commands to activate the server control automation described above with respect to FIG. 4. In another example, the menu 506 may include commands to deactivate, stop, activate, and/or start one of the partitions 504a and 504b.

Figure 5B:
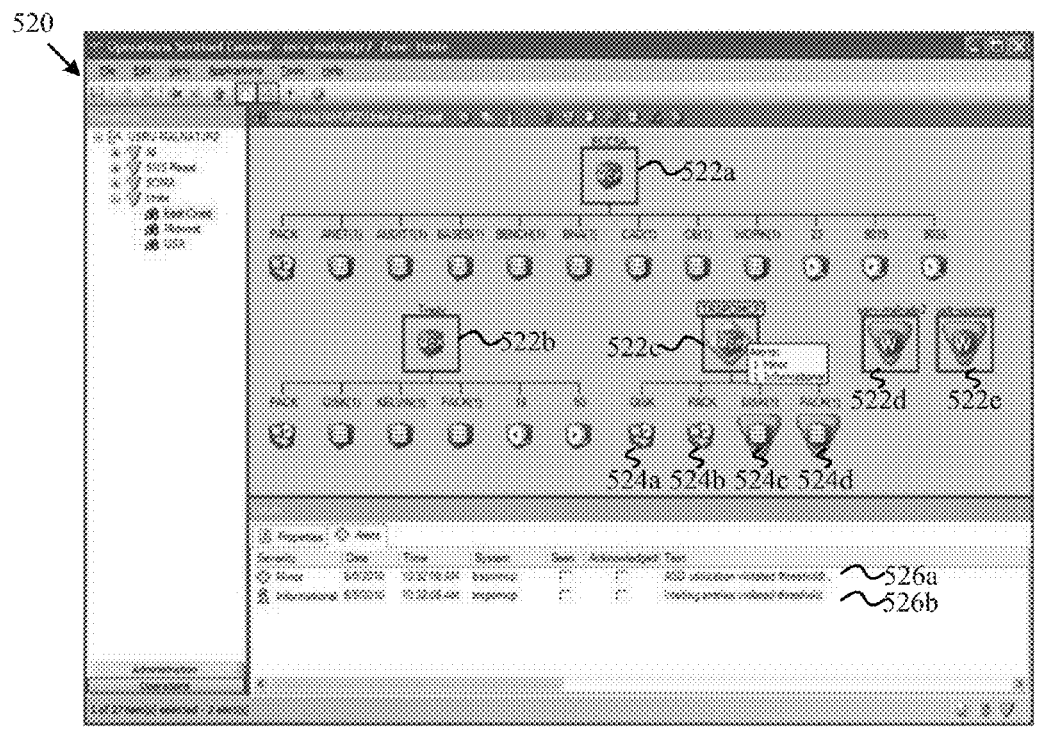
FIG. 5B is a screen shot illustrating the display of alerts through a hierarchical graphical view according to one embodiment of the disclosure.

The status of resources available on the network may also be viewed through the graphical hierarchical tree. FIG. 5B is a screen shot illustrating the display of alerts through a hierarchical graphical view according to one embodiment of the disclosure. A display 520 may include servers 522a, 522b, 522c, 522d, and 522e. The display 520 may also include partitions 524a, 524b, 524c, and 524d associated with the server 522c. Alerts 526a and 526b may be displayed to the administrator regarding the status of resources, such as the servers 522a-e and the partitions 524a-d in the display 500.

According to one embodiment, the servers 522a-e may be of different types. For example, the servers may have different hardware configurations, different software configurations, or different settings within the software. Thus, the servers 522a-e may be monitored through different protocols and/or different methods. The information regarding the different servers may be collected and illustrated in the graphical hierarchical tree of the display 520.

The alerts 526*a-b* may represent any defined exception that the automation needs to bring to the administrator's attention. The alerts 526*a-b* may drive non-visual interfaces defined in an alert policy (such as email or text messages, audible alerts, and many other notifications such as Simple Network Management Protocol (SNMP) traps). The alerts 526*a-b* may be classified into one of a number of levels of alert severity and may be presented in the display 500 along with help text to assist the administrator. According to one embodiment, seven levels of alert severity may be used to classify the alerts.

Figure 5C:
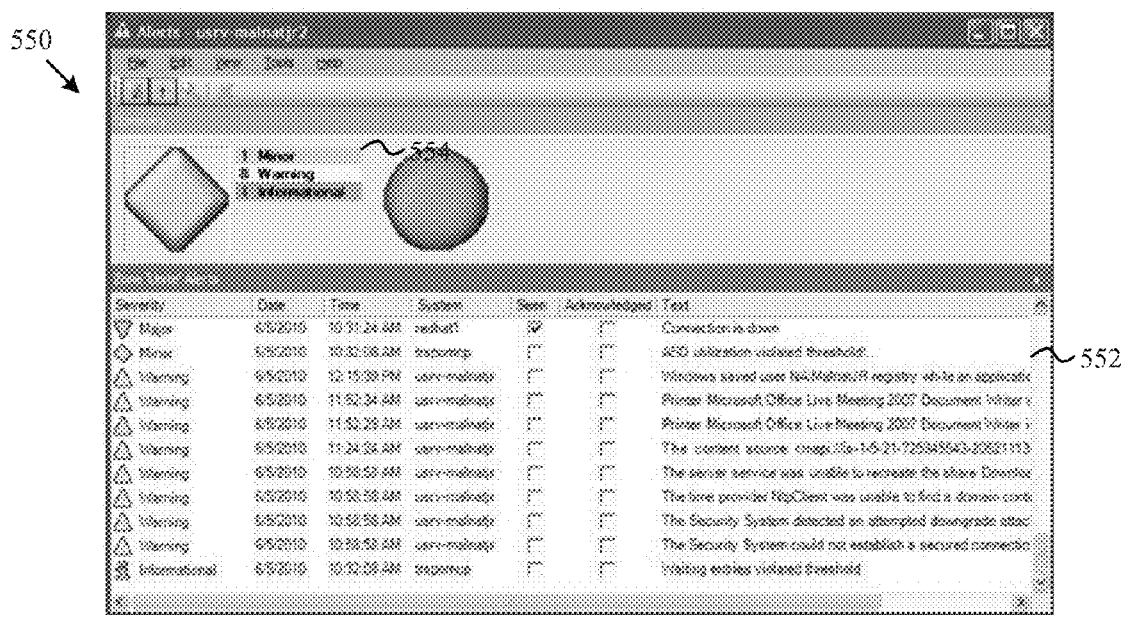
FIG. 5C is a screen shot illustrating the display of detailed alerts according to one embodiment of the disclosure.

A more detailed level of alerts may be displayed in a separate window. FIG. 5C is a screen shot illustrating the display of detailed alerts according to one embodiment of the disclosure. A display 550 may include a listing 552 of alerts. Information about each alert may be included in the listing 552, such as a severity, a date, a time, a system generating the alert, an indicator whether the alert has been read, an indicator whether the alert has been acknowledge, and/or a text description of the alert. A summary 554 of the alerts may be generated by providing a total number of alerts in each severity of alerts.

A read status may be used to signify that an administrator has seen the alert. When a read status is marked for an alert, the alert may no longer contribute to the summary 554 of alerts. However, other administrators may still be provided with the alert. When an administrator take responsibility for the alert, the administrator may acknowledge the alert. When the alert is acknowledged, the alert may be removed from the listing 552 of alerts provided to other administrators. If a severity of an alert changes, based in part on additional information received by the monitoring server, the read and acknowledged status of the alert may be reset. Thus, the display 550 may be customized for individual administrators.

According to one embodiment, the alerts of the listing 552 may be logged to a central log file. The log file may capture messages generated by servers and partitions being managed and/or other events occurring in the network. The log may also include information from third-party products operating on the servers and/or partitions. The centralized log file may be available for searching by an administrator to allow quick access to particular events in the log. An administrator may configure a specified amount of storage space for the centralized log file. Old entries in the log may be deleted to make space for new log entries when the storage space is full.

Figure 6:
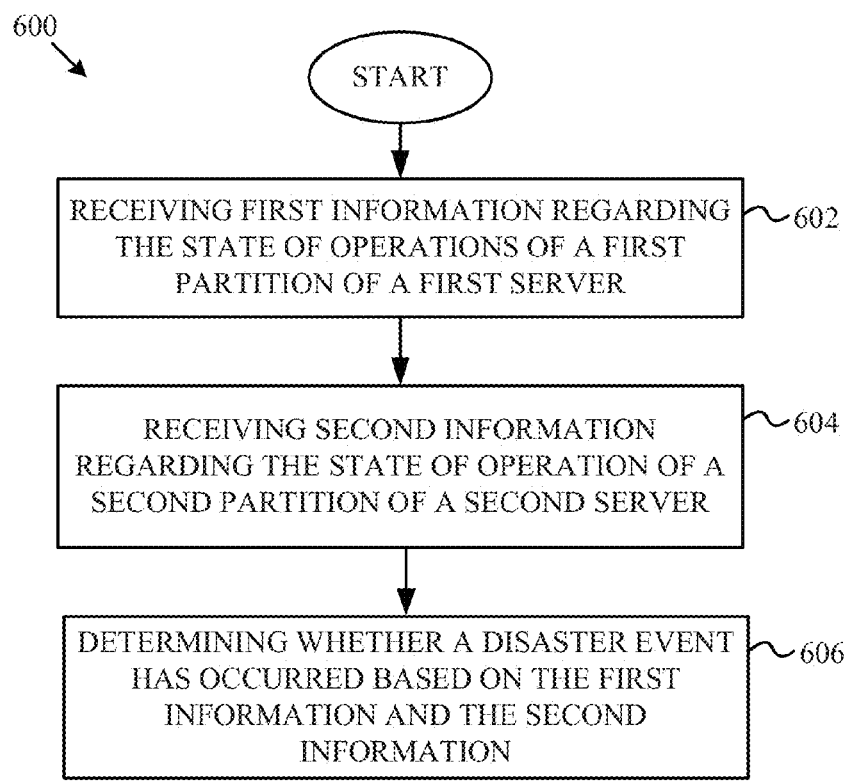
FIG. 6 is a flow chart illustrating an exemplary method for generating alerts according to one embodiment of the disclosure.

FIG. 6 is a flow chart illustrating an exemplary method for generating alerts according to one embodiment of the disclosure. A method 600 begins at block 602 with receiving first information regarding the state of operations of a first partition of a first server. At block 604, second information may be received regarding the state of operation of a second partition of a second server. The first information and the second information may be received as operator messages or other network traffic, such as simple network management protocol (SNMP) messages. According to one embodiment, the first information and the second information may be received by parsing text received through a remote communications session, such as a telnet or secure shell session.

At block 606, it is determined whether a disaster event has occurred based on the first information and the second information. If a disaster event occurs, an alert may be generated and displayed, such as in the listing 552 of FIG. 5C. A disaster event may not be a complete failure of a partition or a server, but may include events leading up to a potential failure of the partition or the server. For example, a disaster event may be detected when a server service is unable to recreate a share on a partition. In another example, a disaster event may be detected when a secured connection cannot be established with a server or a partition.

After alerts are generated, the monitoring server may take action to respond to the alerts automatically. For example, when an alert is received that a partition becomes unavailable, the monitoring server may automatically make a second partition available through the method described above with reference to FIG. 1. In other examples, alerts may cause the monitoring server to answer a message, send a command to the first server, the second server, or a different server, record the alert, generate a text message to an administrator, and/or execute an application on the monitoring server. According to one embodiment, actions may be taken by issuing commands through the same remote communications session from which the first information and the second information are received. Thus, the monitoring server may emulate an end user.

The automated responses performed by the monitoring server may be specified by alert policies. An alert policy may be triggered when an alert is generated, when an alert is read, and/or when an alert is acknowledged. Alert actions may include executing scripts and executing commands to deal directly with the problem raised in the alert. The actions may also include raising external alerts to notify human users and support personnel. By using delayed actions, alerts may be escalated based on how long they have been outstanding. Multiple alert policies may be active on the monitoring server and a particular policy may be selected based, in part, on staffing and other considerations. For example, during a prime shift, a database specialist may be notified when a database-related alert occurs, but on a weekend, the alert policy may first notify an on-call support generalist.

A monitoring server may activate a variety of external alert actions in response to an alert condition, including modem, serial, and command actions. The monitoring server may send text messages to mobile phones, send messages to alphanumeric paging systems using the Telocator Alphanumeric Protocol (TAP), and to devices through other digital protocols. The monitoring server may also send messages to devices connected to a serial port, to drive devices such as scrolling LED wall panel displays, to power control equipment, and to voice output packages running on a PC.

Tickets may be generated based on the determination of a disaster event at block 606. Alert information may be passed to any software running on the monitoring server or on a remote server. This capability may be used to send email and pass information to trouble ticketing applications, such as Remedy Action Request System or the like. In each case, the monitoring server may supply event-specific details such as host name, severity, and alert text to the receiving hardware or software. Tickets may also be entered manually by an administrator.

The alerting and ticketing options described above allow the monitoring server to run unattended. If a disaster event occurs, the monitoring server may page on-call staff, who may then sign in from a remote location (such as from a laptop or an iPad, or an iPhone). Remote access offers staff, with appropriate security privileges, access to the correct displays and control profile.

Resource monitors may be installed on servers being monitored, such as the first server and the second server described in FIG. 6. The resource monitors on the servers may provide the first information and the second information to the monitoring server regarding desktop applications executing on the server, drives on the server, event logs on the server, hardware status of the server, services executing on the server, and/or custom actions defined by an administrator. Resource monitors may also monitor critical processes on a server, identify long-running processes as possible runaway processes, file systems such as amount of free space, logs such as available space, processing utilization such as exceeding certain thresholds, and memory such as exceeding a certain threshold.

Figure 7:
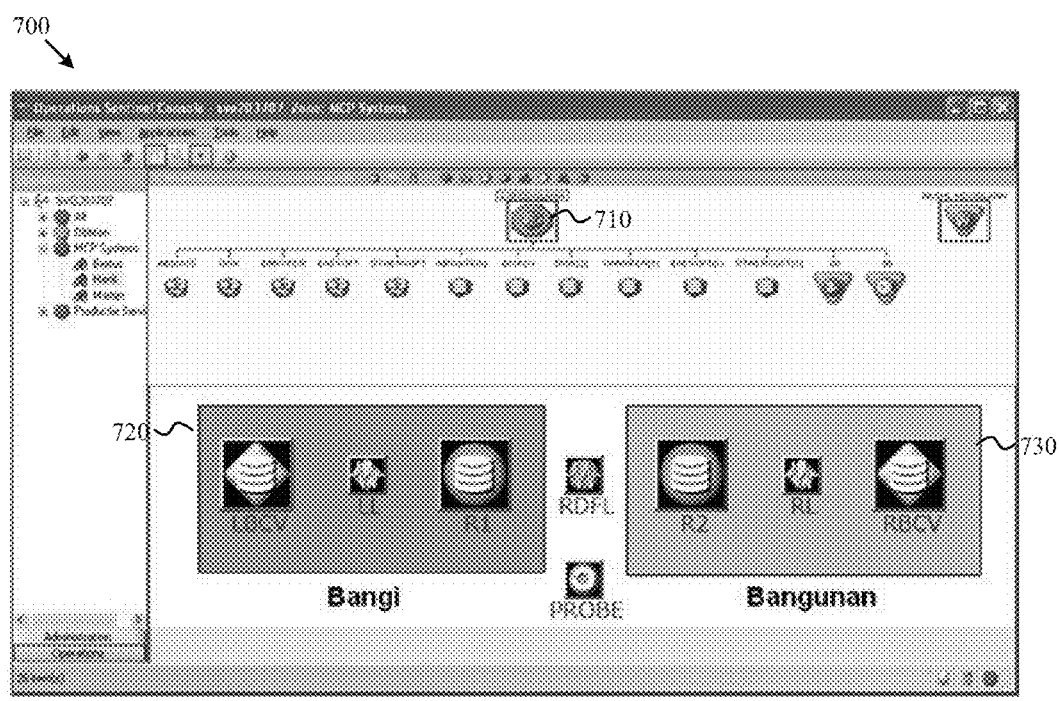
FIG. 7 is a screen shot illustrating monitoring of multiple systems according to one embodiment of the disclosure.

FIG. 7 is a screen shot illustrating monitoring of multiple systems according to one embodiment of the disclosure. A display 700 may include a graphical hierarchical display 710 of connected systems, system statuses, processes statuses, and/or other displays. The display 700 may also include the status of disaster recovery sites 720 and 730, such as partition mirroring systems. According to one embodiment, the recovery site 720 may store a mirror image of one or more systems illustrated in the graphical hierarchical display 710. An administrator may monitor the recovery site 720 to ensure the mirroring remains up-to-date. The display 700 may be customized for different administrators of the monitoring server and may be accessed locally or remotely through other computer systems, mobile devices, and the like.

According to one embodiment, the display 700 may include servers of disparate types. For example, servers in the display 710 may include a server of a first type and a server of a second type. In another example, the backup system 720 may be a disparate type of server from servers listed in the display 710. The monitoring server may receive information from each of the disparate systems and combine the information in a uniform fashion in the display 700.

Figure 8:
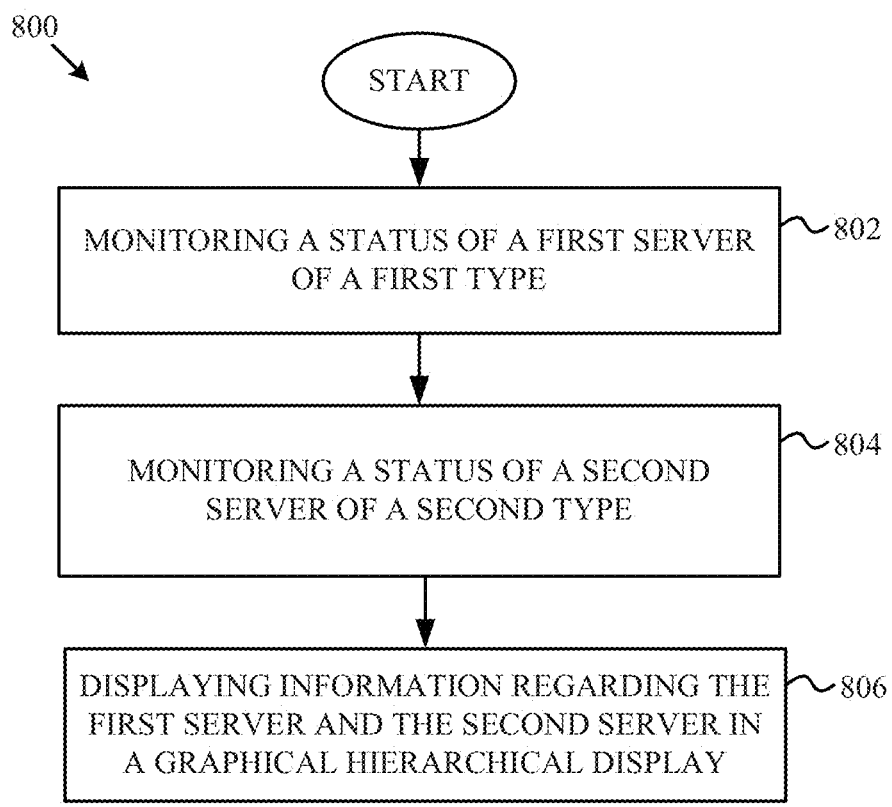
FIG. 8 is a flow chart illustrating monitoring of servers of different types according to one embodiment of the disclosure.

FIG. 8 is a flow chart illustrating monitoring of servers of different types according to one embodiment of the disclosure. A method 800 begins at block 802 with monitoring a status of a first server of a first type. The method 800 continues to block 804 to monitor a status of a second server of a second type. At block 806, the information from the first server and the information from the second server may be displayed in a graphical hierarchical display, such as that of FIGS. 5A-5B and 7.

Figure 9:
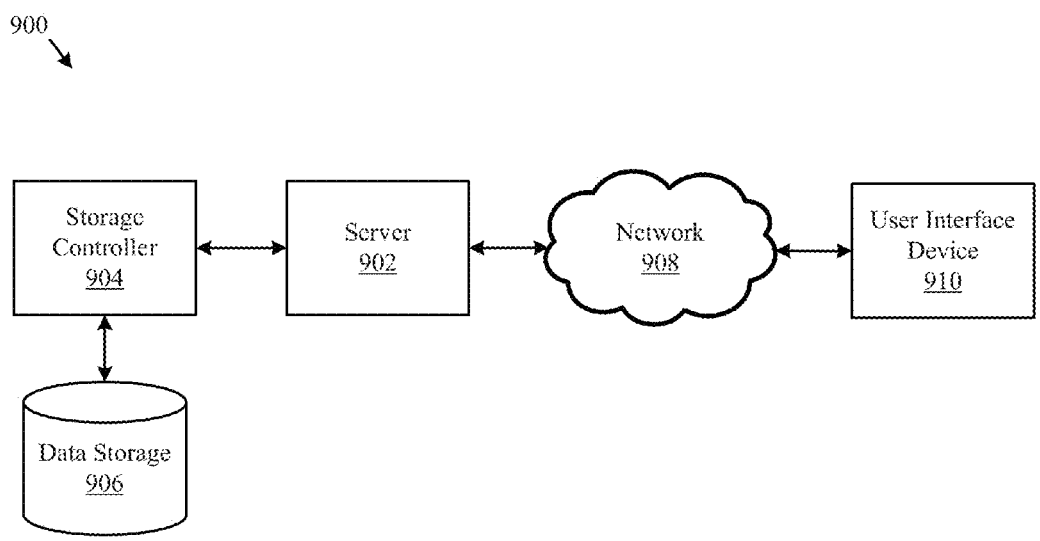
FIG. 9 is a block diagram illustrating a computer network according to one embodiment of the disclosure.

FIG. 9 illustrates one embodiment of a system 900 for an information system, including a system for automating monitoring and responding to disaster events. The system 900 may include a server 902, a data storage device 906, a network 908, and a user interface device 910. The server 902 may be a dedicated server or one server in a cloud computing system. The server 902 may also be a hypervisor-based system executing one or more guest partitions. In a further embodiment, the system 900 may include a storage controller 904, or storage server configured to manage data communications between the data storage device 906 and the server 902 or other components in communication with the network 908. In an alternative embodiment, the storage controller 904 may be coupled to the network 908.

In one embodiment, the user interface device 910 is referred to broadly and is intended to encompass a suitable processor-based device such as a desktop computer, a laptop computer, a personal digital assistant (PDA) or tablet computer, a smartphone or other a mobile communication device having access to the network 908. When the device 910 is a mobile device, sensors (not shown), such as a camera or accelerometer, may be embedded in the device 910. When the device 910 is a desktop computer the sensors may be embedded in an attachment (not shown) to the device 910. In a further embodiment, the user interface device 910 may access the Internet or other wide area or local area network to access a web application or web service hosted by the server 902 and provides a user interface for enabling a user to enter or receive information. For example, the web interface may include a hierarchical graphical display, such as that of FIG. 7.

The network 908 may facilitate communications of data, such as event information, between the server 902 and the user interface device 910. The network 908 may include any type of communications network including, but not limited to, a direct PC-to-PC connection, a local area network (LAN), a wide area network (WAN), a modem-to-modem connection, the Internet, a combination of the above, or any other communications network now known or later developed within the networking arts which permits two or more computers to communicate.

In one embodiment, the user interface device 910 accesses the server 902 through an intermediate server (not shown). For example, in a cloud application the user interface device 910 may access an application server. The application server may fulfill requests from the user interface device 910 by accessing a database management system (DBMS). In this embodiment, the user interface device 910 may be a computer or phone executing a Java application making requests to a JBOSS server executing on a Linux server, which fulfills the requests by accessing a relational database management system (RDMS) on a mainframe server.

Figure 10:
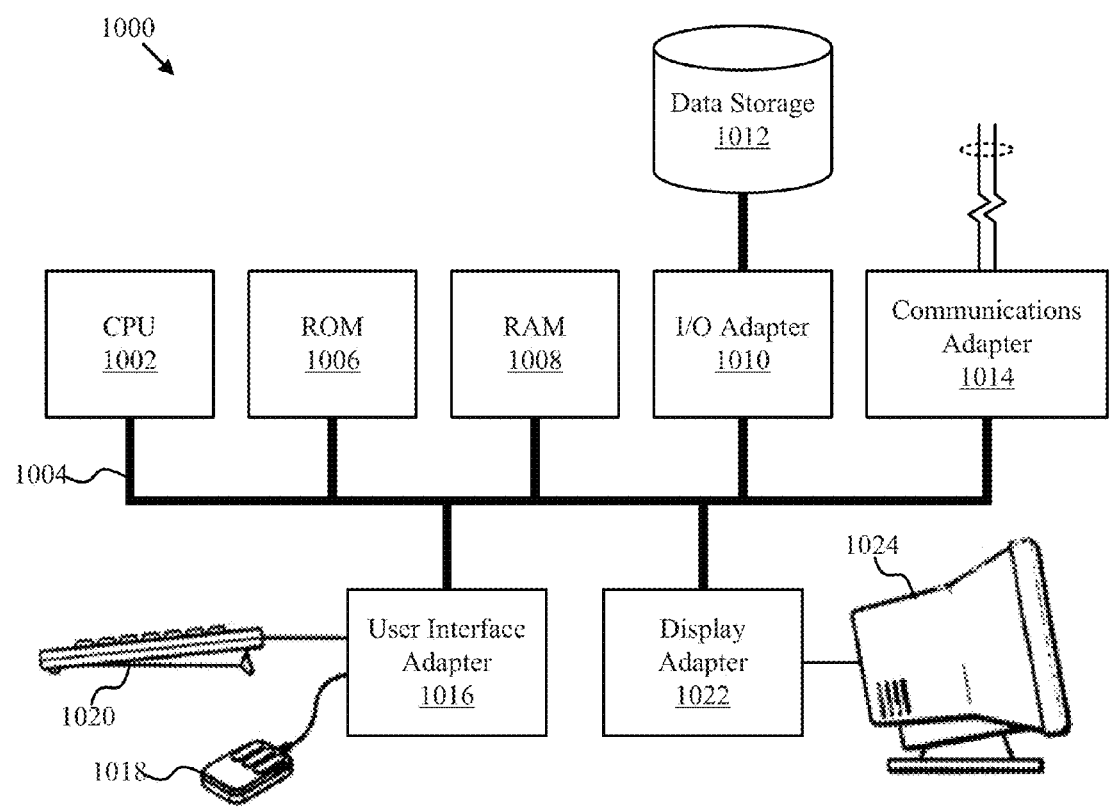
FIG. 10 is a block diagram illustrating a computer system according to one embodiment of the disclosure.

FIG. 10 illustrates a computer system 1000 adapted according to certain embodiments of the server 902 and/or the user interface device 910. The central processing unit ("CPU") 1002 is coupled to the system bus 1004. The CPU 1002 may be a general purpose CPU or microprocessor, graphics processing unit ("GPU"), and/or microcontroller. The present embodiments are not restricted by the architecture of the CPU 1002 so long as the CPU 1002, whether directly or indirectly, supports the operations as described herein. The CPU 1002 may execute the various logical instructions according to the present embodiments.

The computer system 1000 also may include random access memory (RAM) 1008, which may be synchronous RAM (SRAM), dynamic RAM (DRAM), synchronous dynamic RAM (SDRAM), or the like. The computer system 1000 may utilize RAM 1008 to store the various data structures used by a software application. The computer system 1000 may also include read only memory (ROM) 1006 which may be PROM, EPROM, EEPROM, optical storage, or the like. The ROM may store configuration information for booting the computer system 1000. The RAM 1008 and the ROM 1006 hold user and system data, and both the RAM 1008 and the ROM 1006 may be randomly accessed.

The computer system 1000 may also include an input/output (I/O) adapter 1010, a communications adapter 1014, a user interface adapter 1016, and a display adapter 1022. The I/O adapter 1010 and/or the user interface adapter 1016 may, in certain embodiments, enable a user to interact with the computer system 1000. In a further embodiment, the display adapter 1022 may display a graphical user interface (GUI) associated with a software or web-based application on a display device 1024, such as a monitor or touch screen.

The I/O adapter 1010 may couple one or more storage devices 1012, such as one or more of a hard drive, a solid state storage device, a flash drive, a compact disc (CD) drive, a floppy disk drive, and a tape drive, to the computer system 1000. According to one embodiment, the data storage 1012 may be a separate server coupled to the computer system 1000 through a network connection to the I/O adapter 1010. The communications adapter 1014 may be adapted to couple the computer system 1000 to the network 908, which may be one or more of a LAN, WAN, and/or the Internet. The communications adapter 1014 may also be adapted to couple the computer system 1000 to other networks such as a global positioning system (GPS) or a Bluetooth network. The user interface adapter 1016 couples user input devices, such as a keyboard 1020, a pointing device 1018, and/or a touch screen (not shown) to the computer system 1000. The keyboard 1020 may be an on-screen keyboard displayed on a touch panel. Additional devices (not shown) such as a camera, microphone, video camera, accelerometer, compass, and or gyroscope may be coupled to the user interface adapter 1016. The display adapter 1022 may be driven by the CPU 1002 to control the display on the display device 1024. Any of the devices 1002-1022 may be physical and/or logical devices.

The applications of the present disclosure are not limited to the architecture of computer system 1000. Rather the computer system 1000 is provided as an example of one type of computing device that may be adapted to perform the functions of a server 902 and/or the user interface device 910. For example, any suitable processor-based device may be utilized including, without limitation, personal data assistants (PDAs), tablet computers, smartphones, computer game consoles, and multi-processor servers. Moreover, the systems and methods of the present disclosure may be implemented on application specific integrated circuits (ASIC), very large scale integrated (VLSI) circuits, or other circuitry. In fact, persons of ordinary skill in the art may utilize any number of suitable structures capable of executing logical operations according to the described embodiments. For example, the computer system 800 may be virtualized for access by multiple users and/or applications.

Figure 11A:
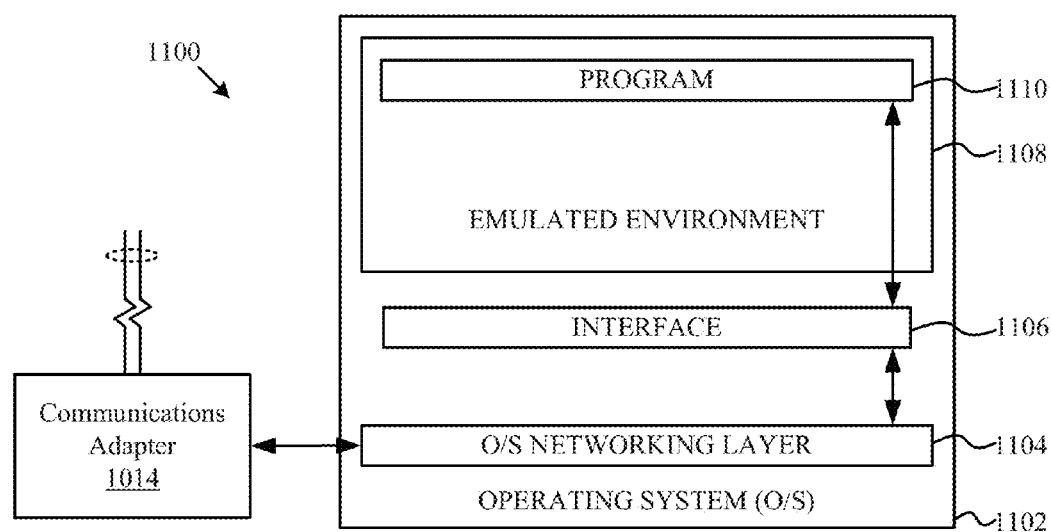
FIG. 11A is a block diagram illustrating a server hosting an emulated software environment for virtualization according to one embodiment of the disclosure.

FIG. 11A is a block diagram illustrating a server hosting an emulated software environment for virtualization according to one embodiment of the disclosure. An operating system 1102 executing on a server includes drivers for accessing hardware components, such as a networking layer 1104 for accessing the communications adapter 1014. The operating system 1102 may be, for example, Linux. An emulated environment 1108 in the operating system 1102 executes a program 1110, such as CPCommOS. The program 1110 accesses the networking layer 1204 of the operating system 1102 through a non-emulated interface 1106, such as XNIOP. The non-emulated interface 1106 translates requests from the program 1110 executing in the emulated environment 1108 for the networking layer 1104 of the operating system 1102.

Figure 11B:
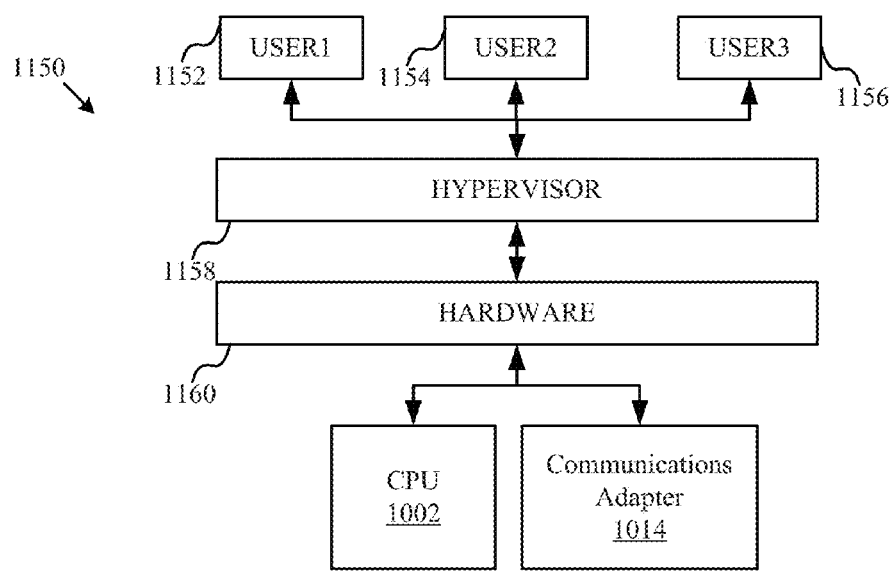
FIG. 11B is a block diagram illustrating a server hosing an emulated hardware environment according to one embodiment of the disclosure.

In another example, hardware in a computer system may be virtualized through a hypervisor. FIG. 11B is a block diagram illustrating a server hosing an emulated hardware environment according to one embodiment of the disclosure. Users 1152, 1154, 1156 may access the hardware 1160 through a hypervisor 1158. The hypervisor 1158 may be integrated with the hardware 1160 to provide virtualization of the hardware 1160 without an operating system, such as in the configuration illustrated in FIG. 11A. The hypervisor 1158 may provide access to the hardware 1160, including the CPU 1002 and the communications adaptor 1004.

If implemented in firmware and/or software, the functions described above may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc includes compact discs (CD), laser discs, optical discs, digital versatile discs (DVD), floppy disks and blu-ray discs. Generally, disks reproduce data magnetically, and discs reproduce data optically. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the present invention, disclosure, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A method, comprising:
   detecting, by a monitoring server, a disaster event affecting a first partition of a first server;
   deactivating, by the monitoring server, the first partition of the first server;
   setting by the monitoring server, jump keys for the second partition;
   setting by the monitoring server, boot settings for the second partition;
   activating, by the monitoring server, a second partition of a second server; and
   starting, by the monitoring server, the second partition of the second server.

2. The method of claim 1, further comprising applying, by the monitoring server, boot settings to the second partition before starting the second partition.

3. The method of claim 1, further comprising selecting, by the monitoring server, an application to recover before activating the second partition, in which the second partition of the second server corresponds to the selected application.

4. The method of claim 1, further comprising communicating, by the monitoring server, with the second server through a remote communications session.

5. The method of claim 1, further comprising stopping, by the monitoring server, the first partition of the first server.

6. The method of claim 1, further comprising:
   activating, by the monitoring server, a third partition of a third. server; and
   starting, by the monitoring server, the third partition of the third server.

7. The method of claim 6, in which the third partition and the second partition are started in a predetermined order by the monitoring server.

8. A computer program product, comprising:
   a non-transitory computer readable medium comprising:

code to detect, by a monitoring server, a disaster event affecting a first partition of a first server;
code to deactivate, by the monitoring server, the first partition of the first server;
code to set, by the monitoring server, jump keys for the second partition;
code to set, by the monitoring server, boot settings for the second partition;
code to activate, by the monitoring server, a second partition of a second server; and
code to start, by the monitoring server, the second partition of the second server.

9. The computer program product of claim 8, in which the medium further comprises code to apply, by the monitoring server, boot settings to the second partition before starting the second partition.

10. The computer program product of claim 8, in which the medium further comprises code to select, by the monitoring server, an application to recover before activating the second partition, in which the second partition of the second server corresponds to the selected application.

11. The computer program product of claim 8, in which the medium further comprises code to communicate, by the monitoring server, with the second server through a remote communications session, 12. The computer program product of claim 8, in which the medium further comprises code to stop, by the monitoring server, the first partition of the first server.

13. The computer program product of claim 8, in which the medium further comprises:
code to activate, by the monitoring server, a third partition of a third server; and
code to start, by the monitoring server, the third partition of the third server.

14. The computer program product of claim 13, in which the medium further comprises code to start the second partition and to start the third partition in a predetermined order.

15. An apparatus, comprising:
a memory;
a network interface; and
a processor coupled to the memory and the network interface, in which the processor is configured:
to detect, through the network interface, a disaster event affecting a first partition of a first server;
to deactivate, through the network interface, the first partition of the first server;
to set, through the network interface, jump keys for the second partition:
to set, through the network interface, boot settings for the second partition;
to activate, through the network interface, a second partition of a second server; and
to start, through the network interface, the second partition of the second server.

16. The apparatus of claim 15, in which the processor is further configured to apply, through the network interface, boot settings to the second partition before starting the second partition.

17. The apparatus of claim 15, in which the processor is further configured to select, through the network interface, an application to recover before activating the second partition, in which the second partition of the second server corresponds to the selected application.

18. The apparatus of claim 15, in which the processor is further configured to communicate, through the network interface, with the second server through a remote communications session.

19. The apparatus of claim 15, in which the processor is further configured:
to activate, through the network interface, a third partition of a third server; and
to start, through the network interface, the third partition of the third server.

20. The apparatus of claim 15, in which the processor is further configured to start the second partition and to start the third partition in a predetermined order.

* * * * *

UNITED STATES PATENT AND TRADEMARK OFFICE
CERTIFICATE OF CORRECTION

| | |
|---|---|
| PATENT NO. | : 8,832,490 B2 |
| APPLICATION NO. | : 13/536108 |
| DATED | : September 9, 2014 |
| INVENTOR(S) | : James Malnati and Robert Jamieson |

It is certified that error appears in the above-identified patent and that said Letters Patent is hereby corrected as shown below:

On the title page item 75 should read

Inventors: James Malnati AND Robert Jamieson

Signed and Sealed this
Twenty-sixth Day of April, 2016

Michelle K. Lee
*Director of the United States Patent and Trademark Office*